US006199314B1

(12) United States Patent
Ballard

(10) Patent No.: US 6,199,314 B1
(45) Date of Patent: Mar. 13, 2001

(54) MOUSE TRAP COCKING DEVICE

(76) Inventor: Everett B. Ballard, 581 Bob Moritz Dr., Fredericksburg, TX (US) 78624

( * ) Notice: Subject to any disclaimer, the term of this patent is extended or adjusted under 35 U.S.C. 154(b) by 0 days.

(21) Appl. No.: 09/360,030

(22) Filed: Jul. 23, 1999

(51) Int. Cl.[7] .................................................. A01M 23/28
(52) U.S. Cl. ........................... 43/97; 43/58; 43/43; 43/81
(58) Field of Search ................................ 43/81, 81.5, 58, 43/96, 97

(56) References Cited

U.S. PATENT DOCUMENTS

| | | | | |
|---|---|---|---|---|
| 1,997,932 | * | 4/1935 | Houts | 43/96 |
| 2,604,722 | * | 7/1952 | Petersen | 43/81.5 |
| 3,769,742 | * | 11/1973 | Spain | 43/81.5 |
| 4,574,519 | * | 3/1986 | Eckebrecht | 43/81 |
| 5,024,183 | * | 6/1991 | Baer | 43/81 |
| 5,050,337 | * | 9/1991 | Moore | 43/97 |
| 5,148,624 | * | 9/1992 | Schmidt | 43/81 |
| 5,172,512 | * | 12/1992 | Bodker | 43/81 |
| 5,337,512 | * | 8/1994 | Krenzler | 43/82 |
| 6,119,391 | * | 9/2000 | Maconga | 43/58 |

* cited by examiner

*Primary Examiner*—Kurt Rowan

(57) ABSTRACT

A housing includes a closed bottom, closed sides, an open receiving end and a closed rear end. The housing is adapted to receive a platform of a conventional mouse trap therein. A cocking handle includes a pair of handle arms attached to pivotal connections on the sides, and terminating at a cross-bar. A pair of bow urging arms are also attached to the pivotal connections. The bow urging arms have tabs at the distal ends thereof, which are adapted to be positioned beneath a bow of the mouse trap when the platform is slid into the housing of the cocking device. A safety latch is pivotally connected to the housing above the receiving end. By rotating the cocking handle, the bow urging arms urge the bow to a cocked position. The catch member is then pivoted inward to maintain the bow in the cocked position until the locking arm of the mouse trap is engaged in the bait pedal of the mouse trap.

2 Claims, 6 Drawing Sheets

16B
16A
16C
25

16
16A
16B
A
B
18C
25
20A
18D
20
16C
14
20B
18B
18A
18

3B
20
26A
26C
26
3C
26
20B
26A
3B 26B
26C
20
26
26A 26B
26C
20
26
26A

MOUSE TRAP COCKING DEVICE

BACKGROUND OF THE INVENTION

1. Field of the Invention

The present invention relates to rodent traps.

2. Description of the Related Art

When setting a conventional mouse trap, the bow is sometimes prematurely released while the user is engaging the locking bar with the bait pedal. In this situation, the bow may spring down on top of a thumb or finger of the person setting the trap, resulting in pain and injury.

When unloading a trap, the fingers of the user often unintentionally come into contact with the dead rodent, or at least come uncomfortably near the rodent.

Until the present invention, no device has been developed which works with conventional mouse traps, and which deals with the aforementioned problems.

SUMMARY OF THE INVENTION

The mouse trap cocking device of the present invention includes a housing having a closed bottom, closed sides, an open receiving end and a closed rear end. The housing is adapted to receive a platform of a conventional mouse trap therein.

A cocking handle includes a pair of handle arms attached to pivotal connections on the sides, and terminating at a cross-bar. A pair of bow urging arms are also attached to the pivotal connections. The bow urging arms have tabs at the distal ends thereof, which are adapted to be positioned beneath a bow of the mouse trap when the platform is housed within the housing of the cocking device. A safety latch is pivotally connected to the housing at the closed end.

After the mouse trap is inserted into the cocking device and the tabs of the bow urging arms are positioned beneath the bow, bait is placed onto the bait pedal, and the cocking handle is raised, thus urging the tabs of the bow urging arms against the bow, thus urging the bow to the cocked position.

The cocking handle in combination with the bow urging arms relieve the user from having to handle the bow while cocking the bow, which would increase the danger of fingers becoming pinched from premature actuation of the trap.

The safety latch pivots inward to hold the bow in the cocked position. Next, the user moves the cocking handle to a position which enables the bow urging arms to move freely without engaging the cocking handle. Then the user moves the locking arm to engage the locking arm with the bait pedal in the conventional fashion.

Because the safety latch is holding the bow in the cocked position, the user does not have to worry about the bow springing prematurely toward the first end of the trap. The user may then place the trap and cocking device in an appropriate place to trap and kill mice.

Still further features and advantages will become apparent from the ensuing description and drawings.

DETAILED DESCRIPTION

Figure 1:
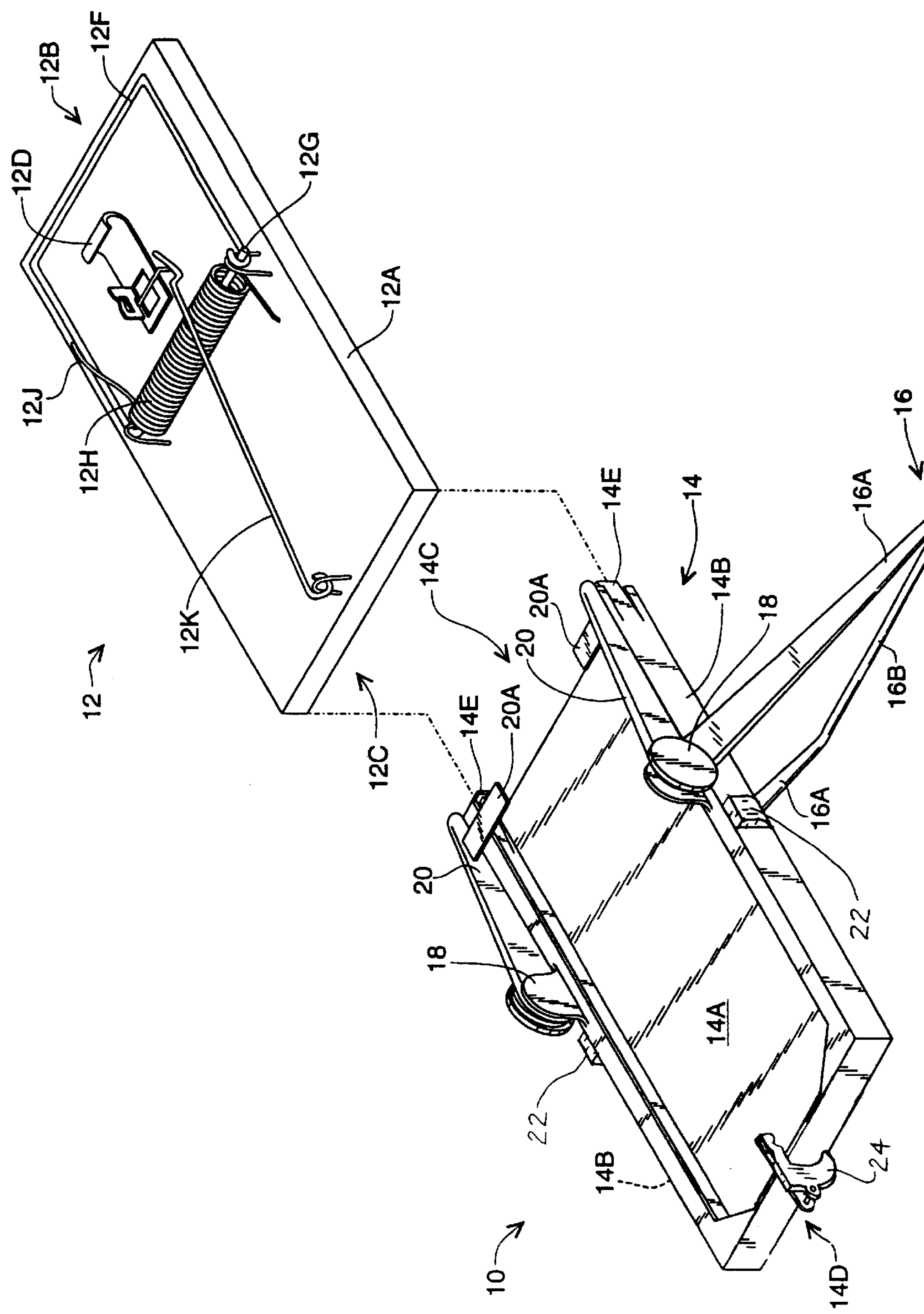
FIG. 1 is an exploded perspective view of a mouse trap cocking device of the present invention, and a conventional mouse trap in a sprung position.

FIG. 1 is an exploded perspective view of a mouse trap cocking device 10 of the present invention, and a conventional mouse trap 12 in a sprung position. The device 10 includes a housing 14 which is adapted to receive a platform 12A of the mouse trap 12 therein. The mouse trap platform 12A conventionally has a first end 12B where a bait pedal 12D is positioned, and a second end 12C opposite the first end 12B.

The mouse trap 12 also comprises a bow 12F extending outwardly from a bar 12G which extends through a center of a coiled spring 12H. The spring 12H is transversely disposed across the platform 12A, and is configured to urge a lever arm 12J against the bow 12F to spring the bow 12F downwardly against the first end 12B of the platform 12A. A locking arm 12K is conventionally provided to engage the bait pedal 12D and to hold the bow 12F in a cocked position.

The housing 14 is generally rectangular box shaped, including a closed bottom 14A, closed sides 14B, an open receiving end 14C and a closed rear end 14D. Holding tabs 14E are disposed at opposite sides of the receiving end 14C. To place the platform 12A of the mouse trap 12 within the housing 14, the tabs 14E are urged outward and then the platform 12A is slid into the housing 14 through the receiving end 14C. The tabs 14E are then released to retain the platform 12A within the housing.

A generally U-shaped cocking handle 16 includes a pair of handle arms 16A attached to pivotal connections 18 on the sides 14B, and terminating at a cross-bar 16B. A pair of bow urging arms 20 are also attached to the pivotal connections 18.

Figure 2:
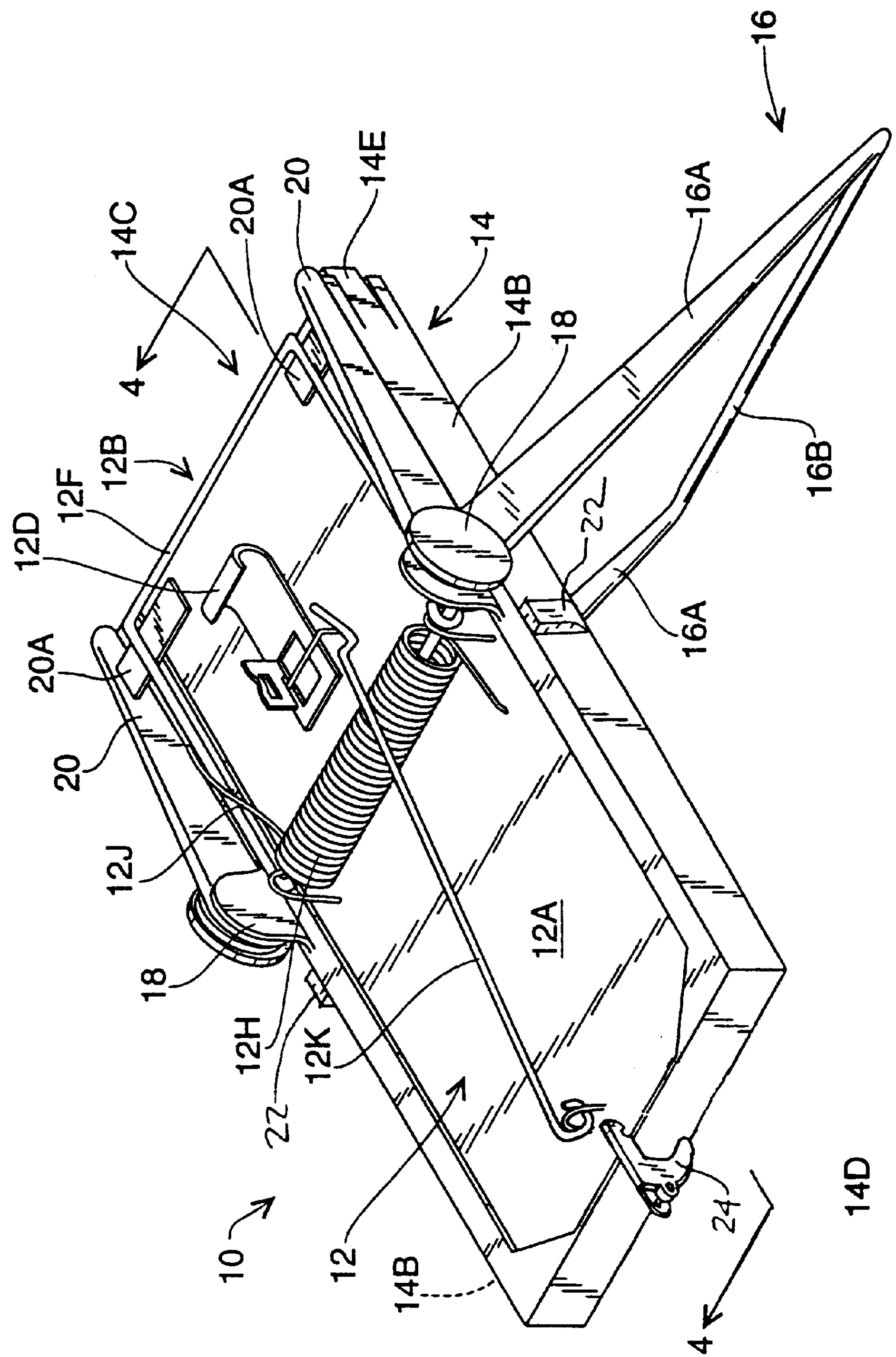
FIG. 2 is a perspective view of the mouse trap loaded into the cocking device.

FIG. 2 is a perspective view of the mouse trap 12 loaded into the cocking device 10. Referring to FIGS. 1 and 2, the bow urging arms 20 have tabs 20A at the distal ends thereof. After sliding the platform 12A into the housing 14, the user (not shown) bends the bow urging arms 20 outward away from each other slightly, until the tabs 20A clear the bow 12F. The user then passes the tabs 20A from above the bow 12F to below the bow 12F, which is the position shown in FIG. 2.

The cocking device 10 also includes a safety latch 24 pivotally connected to the housing 14 at the closed end 14D.

Figures 3, 3A, 3B, 3C, 3D:
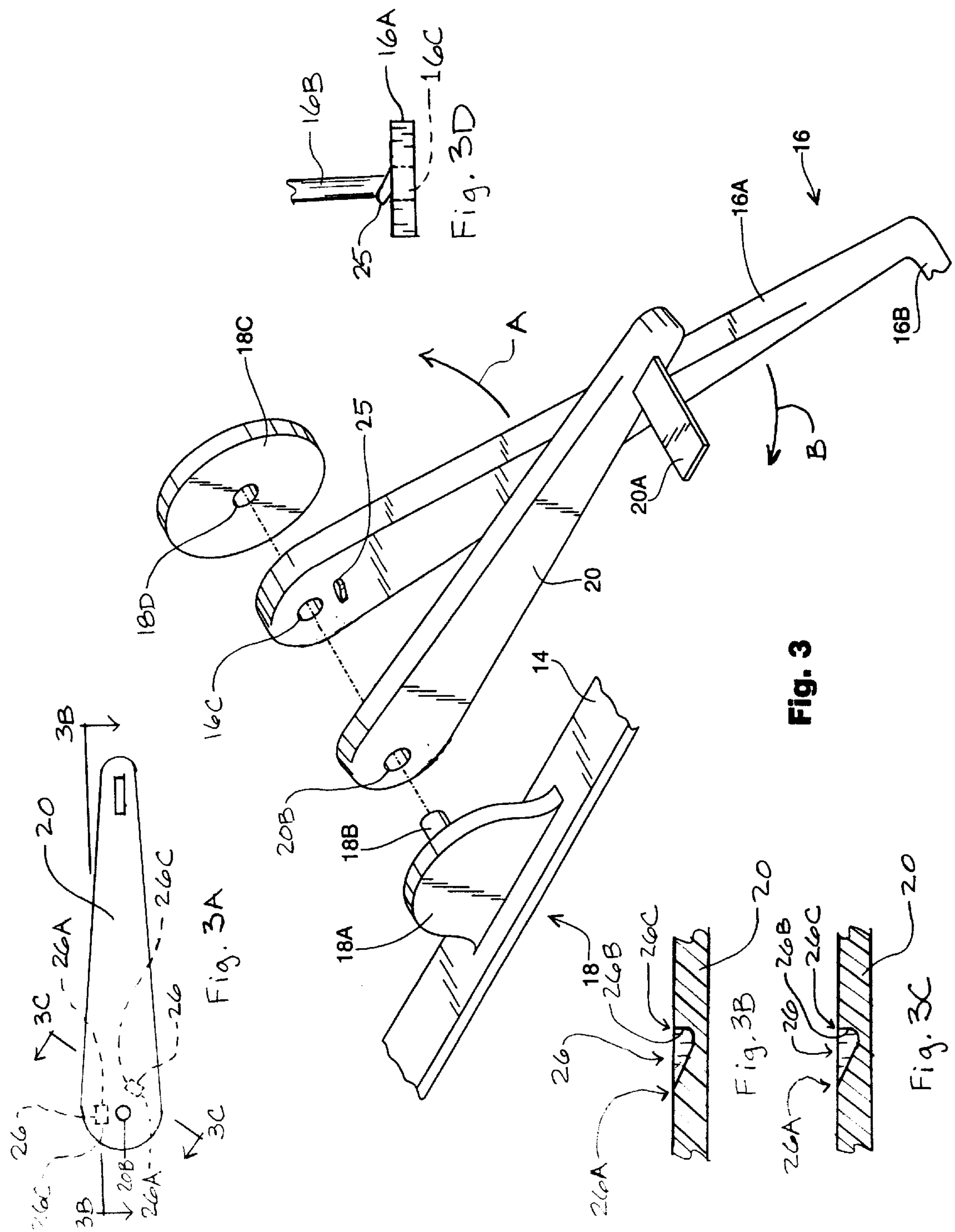
FIG. 3 is a partial exploded perspective view of one of the handle arms and one of the bow urging arms.
FIG. 3A is an elevational view of the bow urging arm shown in FIG. 3.
FIGS. 3B and 3C are partial cross-sectional views of the bow urging arm, taken along lines 3B—3B and 3C—3C respectively of FIG. 3A.
FIG. 3D is a partial end elevational view of the handle arm of FIG. 3.

FIG. 3 is a partial exploded perspective view of one of the handle arms 16A, and one of the bow urging arms 20. The structure shown in FIGS. 3 through 3D and described herein relative there-to, is the same at the other bow handle arm 16A and bow urging arm 20. The pivotal connection 18 includes a support 18A having a pin 18B extending outwardly therefrom. The pin 18B engages the handle arm 16A, the bow urging arm 20, and an end cap 18C, through pivot holes 20B, 16C and 18D.

A spur 25 depends outwardly from the handle arm 16A near the pivot hole 16C of the handle arm 16A. FIG. 3D is a partial end elevational view of the handle arm 16A of FIG. 3. The shape and position of the spur 25 is best understood by referring to FIGS. 3 and 3D.

FIG. 3A is an elevational view of the bow urging arm 20 shown in FIG. 3. FIGS. 3B and 3C are partial cross-sectional views of the bow urging arm 20, taken along lines 3B—3B and 3C—3C respectively of FIG. 3A. Referring to FIGS. 3A through 3C, the bow urging arm 20 includes two notches 26 near the pivot hole 20B of the bow urging arm 20. Each notch 26 includes a leading end 26A, and a wall 26B at a trailing end 26C.

When the handle arm 16A rotates relative to the bow urging arm 20 in the direction shown by arrow A in FIG. 3, the spur 25 will catch within either one of the notches 26, and a distal end of the spur 25 will urge against the wall 26B, causing the bow urging arm 20 to rotate with the handle arm 16A.

When the handle arm 16A rotates in the direction shown by arrow B in FIG. 3, the spur 25 will travel out of the notch 26. The handle arm 16A is flexible enough to permit this inward and outward movement of the spur 25 relative to the notch 26.

Figure 4:
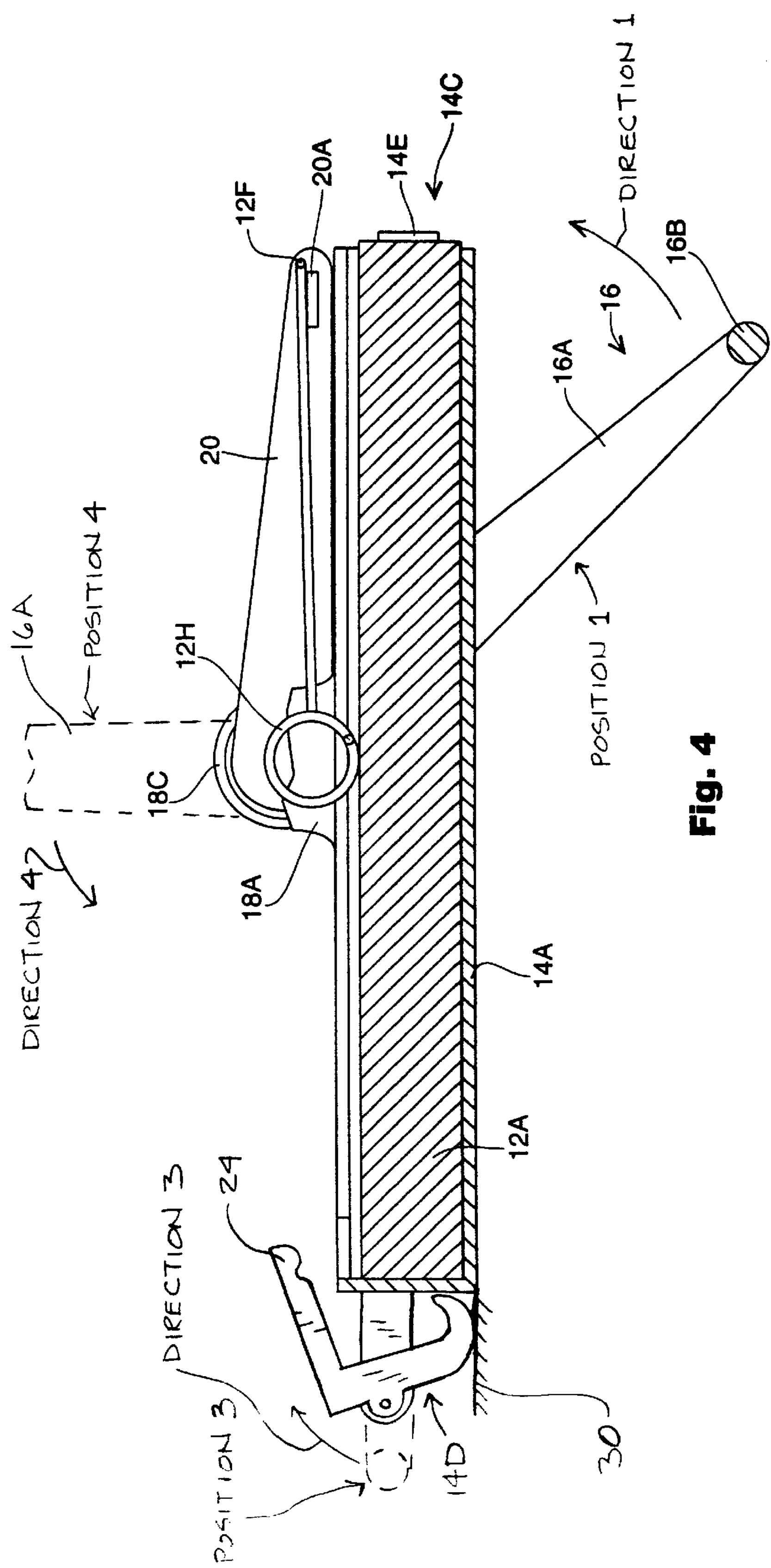
FIG. 4 is cross-sectional view taken along line 4—4 of FIG. 2.
Figure 5:
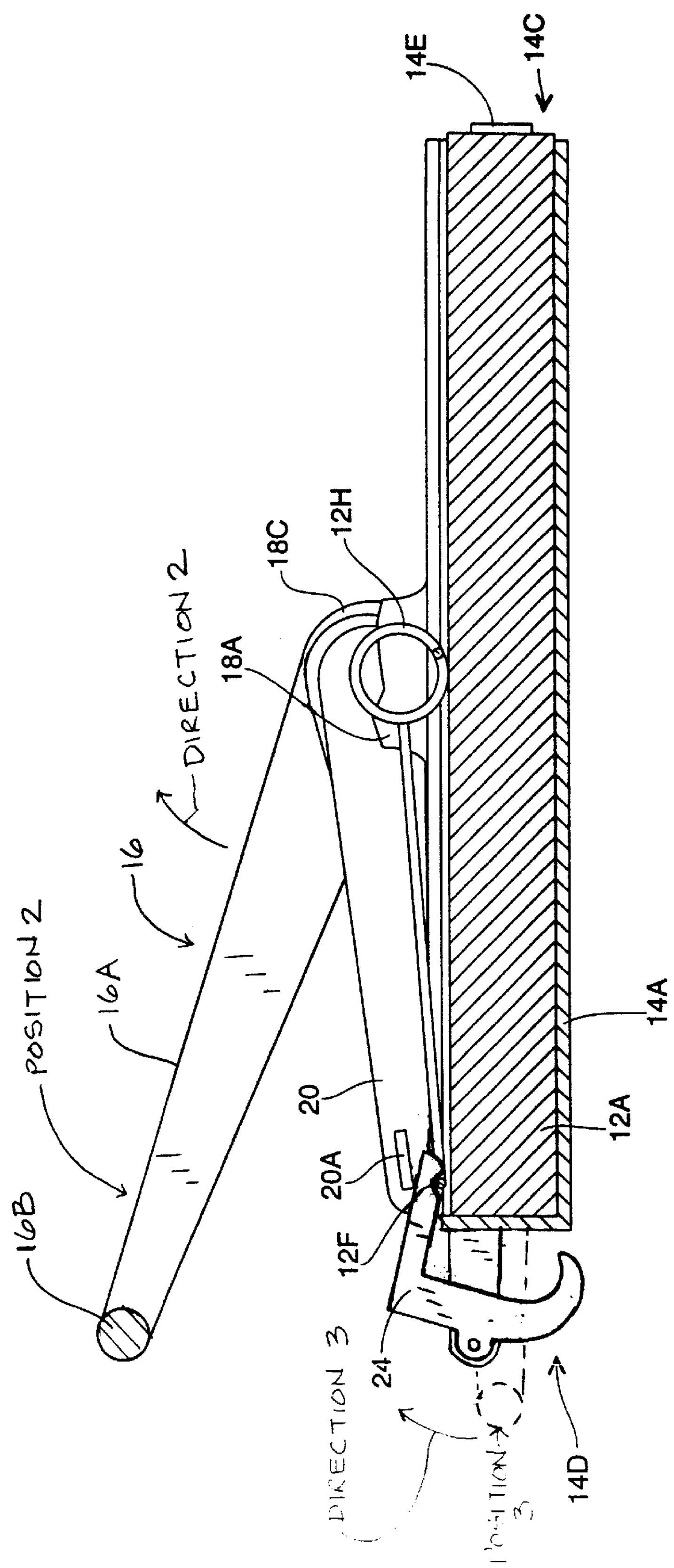
FIG. 5 is a cross-sectional view similar to FIG. 4, except that it shows the trap in a cocked position.

FIG. 4 is cross-sectional view taken along line 4—4 of FIG. 2. FIG. 5 is a cross-sectional view similar to FIG. 4, except that it shows the trap 12 in a cocked position. Referring to FIGS. 4 and 5, after the mouse trap 12 is inserted into the cocking device 10, and the tabs 20A of the bow urging arms 20 are positioned beneath the bow 12F, bait (not shown) is placed onto the bait pedal 12D.

Inspection of FIGS. 3 through 3D will show that the spur 25 is received into one of the notches 26 when the cocking handle 16 is in position 1, and the bow urging arm 20 is in the position shown in FIG. 4. The cocking handle 16 is rotated from position 1 shown in FIG. 4, to position 2 shown in FIG. 5, in the direction 1 as shown by the arrow so labeled in FIG. 4. This rotation of the cocking handle 16 causes the bow urging arms 20 to rotate with the cocking handle 16, urging the bow 12F into the cocked position shown in FIG. 5.

The cocking handle 16 in combination with the bow urging arms 20 relieve the user from having to handle the bow 12F when the bow 12F is cocked, which would increase the danger of fingers becoming pinched from premature springing of the bow 12F toward the first end 12B of the trap 12.

When the bow 12F catches the safety latch 24, the safety latch 24 pivots inward to retain the bow 12F in the cocked position. The dimensions and configuration of the safety latch 24 required to accomplish this function are only generally shown. One skilled in the art could determine the exact dimensions and configuration of the safety latch 24 required to accomplish the function shown and described, without undue experimentation.

Figure 6:
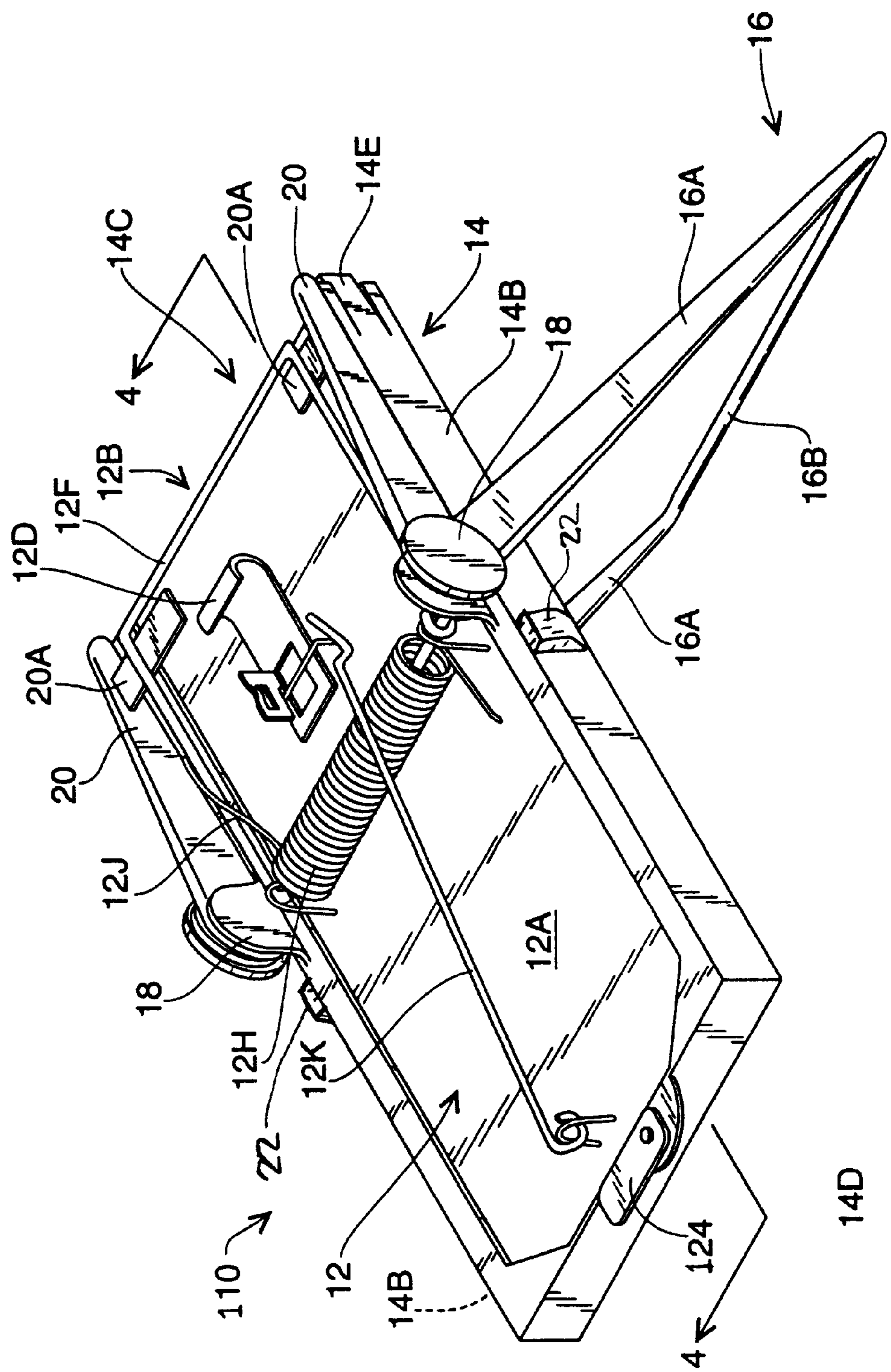
FIG. 6 is a perspective view of the mouse trap loaded into a second embodiment of the cocking device.

FIG. 6 is a perspective view of the mouse trap 12 loaded into a second embodiment of the cocking device 110. In this view, a manually operated safety latch 124 is shown, which can replace the automatic safety latch 24. To use the safety latch 124, the user simply uses his or her thumb to pivot the safety latch 24 inward to retain the bow 12F in the cocked position.

Returning to FIGS. 4 and 5, after the safety latch 24 or 124 engages the bow 12F, the user then rotates the cocking handle 16 from position 2, in direction 2 as shown in FIG. 5, back toward the open end 14C of the housing 14, around and under the housing 14, and then to position 3 as shown in FIG. 5.

When the cocking handle 16 is in position 3, ears 22 (see FIGS. 1 and 2) on the sides 14B of the housing 14 urge the handle arms 16A outward away from the bow urging arms 20, so that the bow urging arms 20 can move freely, and the spurs 25 will not catch within the notches 26.

The user then moves the locking arm 12K to engage the locking arm 12K with the bait pedal 12D in the conventional fashion. Because the safety latch 24 is holding the bow 12F in the cocked position, the user does not have to worry about the bow 12F springing prematurely toward the first end 12B of the trap 12.

The user may then place the trap 12 and cocking device 10 in an appropriate place to trap and kill mice. Referring to FIG. 4, as the housing 14 is placed on a floor 30, the curved lower portion of the safety latch 24 urges against the floor 30 and causes the safety latch 24 to pivot outward, away from the bow 12F. The dimensions and configuration of the safety latch 24 required to accomplish this function are only generally shown. One skilled in the art could determine the exact dimensions of the safety latch 24 required to accomplish this function without undue experimentation.

After a mouse (not shown) is caught in the sprung trap 12, the trap 12 will once again be in the same general position shown in FIG. 4, and the cocking handle 16 will be in position 3 as shown in FIG. 4. The trap 12 is emptied by first rotating the cocking handle 16 in direction 3 to position 4 as shown in FIG. 4, to catch the spur 25 into one of the notches 26. The user then rotates the cocking handle 16 in direction 4 as shown in FIG. 4, urging the bow urging arms 20 and the bow 12F upward away from the trap 12, to release the mouse.

The cocking handle 16 permits the user not to touch the bow 12F and mouse directly to empty the trap 12.

It is envisioned that the cocking device 10 just described could be integral with a mouse trap 12. In such a case, the housing 14 would be deleted and the pivotal connections 18, the ears 22 and the safety latch 24 would be connected directly to the platform 12A.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A mousetrap cocking device comprising:

a flat housing adapted to receive a platform of a conventional mousetrap therein, the housing having two ends and two sides, which are adapted to align with sides of a mousetrap;

a pair of pivotal connections each mounted on a top of a side of said housing;

a pair of bow urging arms, each of the bow urging arms pivotally connected to one of said pivotal connections, said bow urging arms each having a tab extending inwardly therefrom, said tabs being positionable under a bow;

a cocking handle having two handle arms pivotally mounted on said pivotal connections adjacent said bow urging arms and adapted to urge the tabs of said bow urging arms against a bow of a mousetrap to set a bow to a cocked position;

a safety latch mounted on one end of said housing;

wherein said cocking handle includes spurs configured to engage notches within said bow urging arms to move said tabs against a bow when the cocking handle is pivoted to move a bow to a cocked position with said safety latch retaining a bow in a cocked position.

2. A mousetrap cocking device as recited in claim 1, wherein said housing further includes ears disposed on said sides of the housing to urge said handle arms of the cocking handle away from said bow urging arms to permit free rotation of said bow urging arms relative to said cocking handle after a mouse trap is baited and set in a cocked position.

* * * * *